Jan 6, 1931.  A. V. LIVINGSTON  1,787,987
VEHICLE DRIVING APPARATUS AND SYSTEM
Filed Aug. 19, 1929
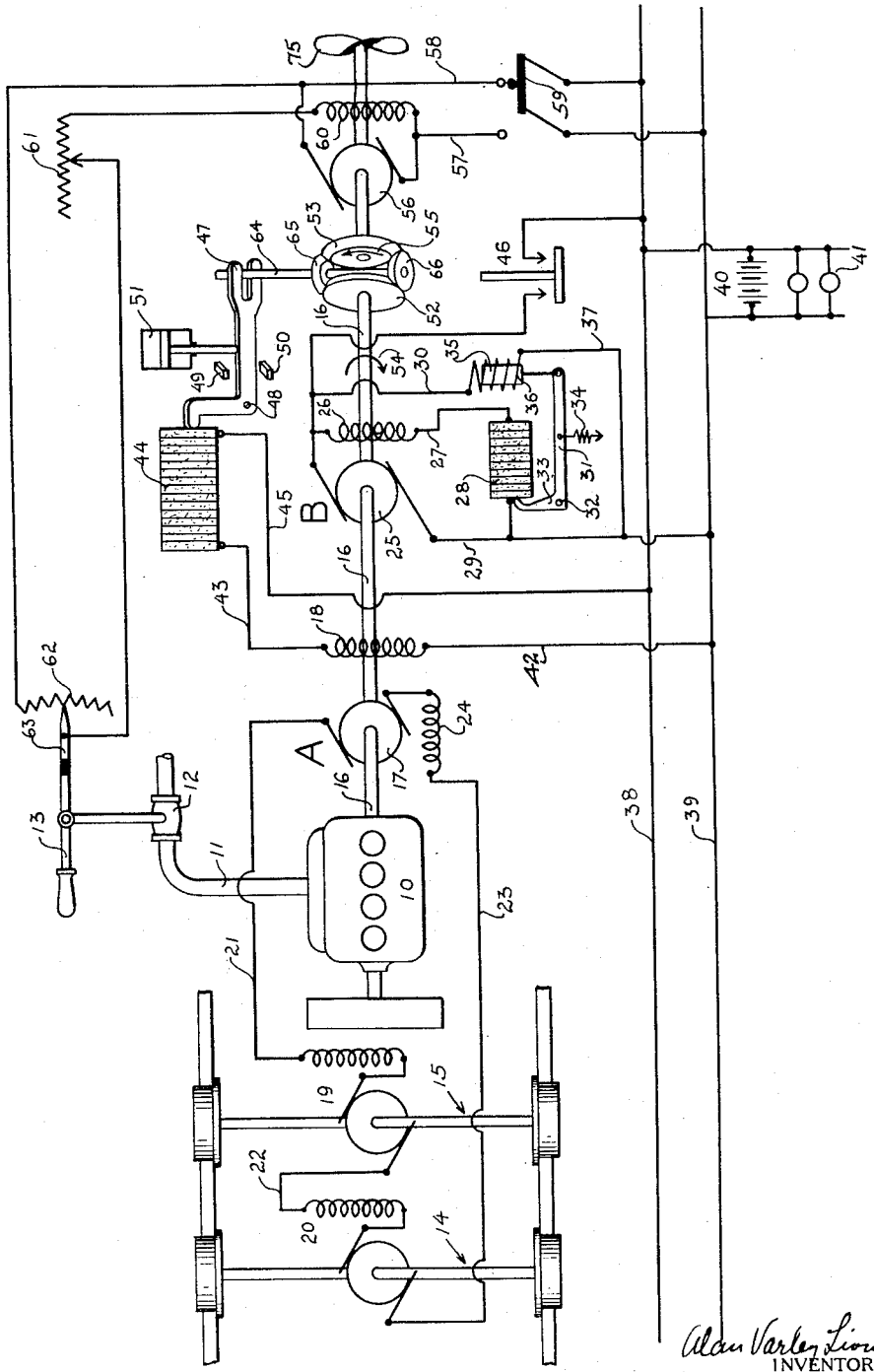
Alan Varley Livingston
INVENTOR
BY Janney, Blair & Curtis
ATTORNEYS Patented Jan. 6, 1931

1,787,987

UNITED STATES PATENT OFFICE

ALAN VARLEY LIVINGSTON, OF ENGLEWOOD, NEW JERSEY, ASSIGNOR TO THE SAFETY CAR HEATING & LIGHTING COMPANY, A CORPORATION OF NEW JERSEY

VEHICLE DRIVING APPARATUS AND SYSTEM

Application filed August 19, 1929. Serial No. 386,856.

This invention relates to power transmission and more particularly to the transmission of power from a prime mover to the driving wheels or axle of a vehicle such as a locomotive, for example.

One of the objects of this invention is to provide a simple, thoroughly practical and dependable apparatus for transmitting power, more particularly from a prime mover to the driving wheels or axles of a vehicle. Another object is to provide a thoroughly practical and dependable system and apparatus for the control of the transmission of power from a source of driving energy to a load. Another object is to provide a system and apparatus for efficiently and dependably transmitting power from a source of driving power, such as an internal combustion engine, to a load even though varying conditions are imposed thereon by the load itself or by the character of the source of motive power. Other objects will be in part obvious or in part pointed out hereinafter.

The invention accordingly consists in the features of construction, combinations of elements, and arrangements of parts as will be exemplified in the structure to be hereinafter described and the scope of the application of which will be indicated in the following claims.

In the single figure of the accompanying drawing there are shown diagrammatically the apparatus and circuit arrangements of the various possible embodiments of this invention.

Referring now to the drawing, there is shown at 10 a prime mover preferably in the form of a gas or oil internal combustion engine; the latter is adapted to be supplied with appropriate fuel from any convenient source, as by the conduit 11, the latter being provided with a throttle 12 for controlling at will the supply of fuel to the prime mover 10, and hence to control the power output of the latter. The throttle or valve 12 is provided with the handle 13 for manual control thereof. The prime mover 10 and its associated apparatus may be mounted in any suitable manner upon the vehicle to be driven, only two pairs of wheels and associated axles 14 and 15 of the latter being shown in the drawing, for the sake of simplicity of illustration.

The prime mover 10 is provided with a driving shaft diagrammatically shown at 16, and operatively driven from the shaft 16 is the armature 17 of a generator generally indicated at A. The generator A is provided with an exciting field winding energized or excited preferably in a manner more clearly set forth hereinafter, and the output of the generator A supplies energy for driving one or more motors connected to the load to be driven, as, for example, connected to one or more of the axles or wheels of the vehicle. Thus, at 19 is diagrammatically indicated a motor operatively connected to the axle 15, and at 20 is indicated a motor connected to the axle 14. The motors 19 and 20 may take any suitable or appropriate form, and by way of illustration are shown in the drawing as being of the series type. If more than one driving motor is employed, for example, the two motors 19 and 20, as shown in the drawing, the motors may be connected to the generator A in any suitable or appropriate manner and in the drawing are illustratively shown as serially connected. Thus a conductor 21 leads the current output of the generator A to the motor 19, the current thence passing through the motor 19, then by way of conductor 22 to motor 20, and through the motor 20 and thence by way of conductor 23 back to the generator A. Preferably the generator A, to achieve certain advantages hereinafter described, is provided, in addition to the exciting field winding 18, with a differential field winding, and in the drawing the latter is indicated at 24 and as will be clear from the drawing, it will be seen that the current passing from the generator into or through the motor circuit or circuits passes through this differential field winding 24. The output energy of the generator A will thus be seen to be directly transmitted to the driving motors, and with this arrangement it will further be seen that simplicity of arrangement and absence of switching and control devices may be achieved.

Considering now the manner in which the exciting field winding 18 of the generator A is energized, it will be noted first that driven from the prime mover 10 and preferably connected directly thereto, as through the extended driving shaft thereof, is an exciter generator generally indicated at B, and as shown in the drawing the armature 25 of the exciter generator B is directly connected to the driving shaft 16 of the prime mover 10. The exciter generator B is preferably of the shunt wound type, and is hence provided with a shunt field winding 26; the circuit of this shunt winding 26 will be seen to extend from one terminal of the armature 25 of the generator B, thence through the field winding 26, and by way of conductor 27 through a variable resistance, taking the form preferably of a compressible carbon pile 28, and thence by way of conductor 29 back to the other terminal of the generator B.

The carbon pile 28 has associated with it a bell crank lever 31, pivoted as at 32, and provided with an upwardly extending arm 33 which bears against the free or unanchored end of the carbon pile 28. The spring 34 appropriately connected to the lever 31 tends to swing the lever 31 about its pivot 32 in such a direction that the compression of the carbon pile 28 is increased. At one end of the lever 31 there is connected a core 35 forming part of a solenoid, the coil 36 of which is connected by conductors 30 and 37 to the respective terminals of the armature 25 of the exciter generator B. With the arrangement thus far described in connection with the exciter generator B, the voltage of the output of the generator B will be maintained substantially constant irrespective of changes in the speed of drive of the armature 25 of the generator B, due to changes in the speed of the prime mover or internal combustion engine 10. A tendency to raise the voltage of the exciter generator B, due to an increase in the speed of the generator, is at once met by an increase in the resistance of the carbon pile 28 with a consequent and commensurate decrease in the exciting field current of the generator B. A decrease in speed of the exciter generator B will bring about a reverse action, and thus constancy of voltage of the output of the exciter generator B will be seen to be maintained. The voltage of the output of the generator B is such that it is sufficient to supply the exciting field winding 18 of the main generator A with ample excitation and to meet the maximum requirements in this respect of the main generator A.

The exciter generator B supplies energy to a train line 38—39 from which various auxiliary devices, such as a storage battery 40, lamps 41, etc., for example, may be operated. The field winding 18 of the generator A is supplied with current from the generator B, preferably from the train line 38—39.

Thus, the circuit of the field winding 18 will be seen to extend from train line conductor 39, conductor 42, winding 18, conductor 43, variable resistance, preferably in the form of a carbon pile 44, and thence by way of conductor 45 to the other conductor 38 of the train line.

The exciter generator B is connected to the train line 38—39 preferably through an automatic switch indicated at 46 adapted to connect or disconnect the generator B to the train line 38—39 in accordance with the activity or inactivity respectively of the generator B. The storage battery 40 is preferably of such characteristics that it may be maintained adequately charged at the voltage of the generator B maintained substantially constant by the regulating coil 36.

The carbon pile 44 in the circuit of the winding 18 of the main generator A is operated upon by a bell crank lever 47 pivoted as at 48, suitable stops 49—50 being provided to limit the range of movement of the lever 47 about its pivot 48. A dash-pot 51, of any suitable construction, is connected to the bell crank lever 47 and acts to steady or damp the movements of the lever 47.

If the lever 47 is swung in clockwise direction, the resistance 44 is increased and the output of the generator A diminished. If the lever 47 is swung in reversed direction, the compression of the carbon pile 44 diminishes the resistance thereof, causing increased excitation of the generator A, and increasing the output of the latter.

The change in the resistance of the carbon pile 44 is mechanically controlled; more specifically, I provide a gear 52 driven so that it partakes of the same changes in speed as does the generator A and the engine 10. Preferably, I mount the gear 52 upon the shaft 16. The gear 52 is preferably a bevel gear.

Spaced from the gear 52 and in axial alinement therewith is another bevel gear preferably of identical construction with that of gear 52. Assuming that gear 52 is driven in the direction indicated by the arrow 54, I drive gear 53 in the opposite direction, as indicated by the arrow 55. Moreover, gear 53 I drive at a constant speed, preferably by means of an electric motor 56 connected by conductors 57—58 and switch 59 to the train line 38—39, from which it receives its energy.

The field winding 60 of the motor 56 has inserted in it a manually variable resistance 61 and also a resistance 62 variable as by the movable contactor 63 actuated with or by the handle 13 of the throttle valve 12.

Extending between the juxtaposed oppositely rotating gears 52—53 is a shaft 64 pivotally supported to rock about the alined axes of the shaft 16 and of the shaft of the motor 56, having one end thereof connected to the bell crank lever 47, and rotatably carrying two spaced bevel gears 65 and 66 meshing with the gears 52—53.

If the speeds of the two gears 52 and 53 are the same, the shaft 64 remains stationary. If, however, the speed of rotation of gear 52 increases so as to exceed the speed of gear 53, gears 65 and 66 operate to move the shaft about its pivotal support and in a direction, moreover, to swing the bell crank lever 47 in counter-clockwise direction and hence in a direction to diminish the resistance of the carbon pile 44. The excitation of the generator A is thus increased, its output is similarly increased, and the resulting increased load on the internal combustion engine 10 causes the latter to reduce or slacken its speed until the speed of gear 52 again equals the constant speed of the gear 53, whence the two gears 52—53, through the interposed mechanism, hold the carbon pile 44 in a given state of compression.

Should the speed of the engine 10, and hence of the generator A, slacken, due, for example, to the locomotive commencing the ascent of a grade, and due hence to the increased load imposed thereon, the gear 52 begins to rotate at a lesser speed than the fixed speed of gear 52 and the difference in the rates of rotation of these two gears causes the gears 65 and 66 to start swinging the shaft 64 in a direction to move the bell crank lever 47 in clockwise direction about its pivot 48; thus the resistance of the carbon pile 44 is increased, the excitation of the generator A decreased, and its output diminished. This action continues until the output has been sufficiently diminished to permit the speed of the engine 10 to be restored to normal, thus to a speed such that the speed of the gear 52 is again equal to the speed of gear 53.

Thus, any departure in the speed of rotation of the generator A and of the engine 10 brings into action differential mechanical effects operating to change the load on the engine 10 in a direction to bring the speed of the engine and of the generator back to normal.

If it is desired to change the standard of operation of the system and apparatus, that is, to cause the engine 10 and generator A to be controlled to run at a different constant speed, the resistance 61 is suitably changed and by thus varying the excitation of the motor 56 the speed of the motor 56 is changed to a different value, the apparatus, as will now be clear from the foregong, automatically causing such a change in the speed of the engine 10 as will cause the gear 52 to exactly match the new speed of the motor driven gear 53.

In order to better prepare the internal combustion engine 10 to respond promptly to increases in the fuel supply, as determined by the throttle 13, I cause the throttle 13, as by varying the resistance 62 in the field circuit 60 of motor 56, also to increase the speed of motor 56 when the throttle 13 is moved in a direction to increase the fuel supplied to the engine 10. Thus, the speed of the engine is increased, as increases in its fuel supply are made, and I am enabled to make the engine 10 promptly and effectively meet the demand for more power output exactly when it is needed. This is particularly important in locomotive practice. Also, I avoid giving rise to a condition where the engine fails to "pick up" as the fuel input to it is increased.

By appropriately proportioning the changes in the resistance 62 that are brought about for each setting of the throttle 13, I am enabled very accurately to match the power output-speed characteristic of the internal combustion engine 10, being enabled to set or predetermine the speed of rotation of the engine for each different setting of the throttle valve.

The motor 56 derives its energy from the exciter generator B and even though the generator B partakes of whatever changes in speed accompany the operation of the engine 10, the regulating apparatus 36—28 of the generator B insures the maintenance of constancy of voltage of the output of generator B, thus also insuring substantial constancy of energy supply to, and speed of rotation of, the motor 56, for any given setting of the resistances 61 and 62. Preferably, the motor 56 carries a suitable mechanical load, such as a fan 75, in order to steady or make more positive the speed controlling action achieved by the motor 56.

It is also to be understood that the fuel supply controlling means, such as the throttle valve 12, may be operated in any suitable manner, for example, by remote control, or automatically, or manually.

It will thus be seen that there has been provided in this invention a system and apparatus in which the several objects hereinbefore noted, as well as many thoroughly practical advantages, are successfully achieved.

As many possible embodiments may be made of the above invention and as many changes might be made in the embodiment above set forth, it is to be understood that all matter hereinbefore set forth or shown in the accompanying drawing is to be interpreted as illustrative and not in a limiting sense.

I claim:—

1. In apparatus of the character described, in combination, a prime mover, a generator driven thereby, means forming an electrical load for receiving energy from said generator, means for controlling the power output of said generator, a member driven by said prime mover and partaking of any changes in speed thereof, a member rotatable at a predetermined relatively fixed speed, and means responsive to the difference between the speeds of rotation of said two members for operating said control means.

2. In apparatus of the character described, in combination, a prime mover, a generator driven thereby, means forming an electrical load for receiving energy from said generator, means for controlling the power output of said generator, means for controlling the power input to said prime mover, a member driven by said prime mover and partaking of any changes in speed thereof, a member rotatable at a predetermined relatively fixed speed, means responsive to the difference between the speeds of rotation of said two members for operating said first mentioned control means, and means responsive to the operation of said input-controlling means for changing the speed of rotation of said second member.

3. In apparatus of the character described, in combination, a prime mover, a generator driven thereby, means forming an electrical load for receiving energy from said generator, means for controlling the power output of said generator, a member driven by said prime mover and partaking of any changes in speed thereof, a member rotatable at a predetermined relatively fixed speed, means responsive to the difference between the speeds of rotation of said two members for operating said control means, and means to change the speed of one of said members relative to the other to change the standard of operation.

4. In apparatus of the character described, in combination, a prime mover, a generator driven thereby, means forming an electrical load for receiving energy from said generator, means including a variable resistance for controlling the power output of said generator, a member driven by said prime mover and partaking of any changes in speed thereof, a member rotated at a predetermined relatively fixed speed, and means responsive to the difference between the speeds of rotation of said two members for controlling the variation of said resistance.

5. In apparatus of the character described, in combination, a prime mover, a generator driven thereby, means forming an electrical load for receiving energy from said generator, means including a compressible carbon pile for controlling the power output of said generator, differential gear mechanism, one gear member being driven by said prime mover, means for driving another gear member of said mechanism at a predetermined speed, and means causing the coacting gear means of said differential gear mechanism for varying the pressure on said carbon pile.

6. In apparatus of the character described, in combination, a prime mover, a generator driven thereby, means forming an electrical load for receiving energy from said generator, means for controlling the power output of said generator, a member driven by said prime mover and partaking of any changes in speed thereof, a rotatable member, a motor for driving said last-mentioned member, a generator driven by said prime mover and regulated for substantially constant voltage supplying energy to said motor, and means responsive to the difference between the speeds of rotation of said two members for controlling said control means.

7. In apparatus of the character described, in combination, an internal combustion engine having a power output-speed characteristic such that a change in its power output is accompanied by a change in its speed, a load supplied with energy from said engine, variable power transmission means interposed between said engine and said load, a member rotated by said engine, a member rotated at a substantially fixed speed, and means responsive to the difference between the speeds of rotation of said two members for controlling said variable power transmission means.

8. In apparatus of the character described, in combination, an internal combustion engine having a power output-speed characteristic such that a change in its power output is accompanied by a change in its speed, a load supplied with energy from said engine, variable power transmission means interposed between said engine and said load, a member rotated by said engine, a member rotated at a substantially fixed speed, means for affecting said power transmission means to change the energy transmitted thereby to said load, and means responsive to the difference between the speeds of said two members for operating upon said last-mentioned means and acting to operate the latter, when said engine-driven member exceeds the speed of the other member, to cause an increase in the amount of power transmitted, and when said engine-driven member operates slower than said other member to operate said affecting means in a direction to cause said variable power transmission to transmit a lesser amount of power.

9. In apparatus of the character described, a vehicle carrying an internal combustion engine, a generator driven thereby, a motor for driving said vehicle and supplied with energy from said generator, means for controlling the power output of said generator, means rotated at a relatively fixed speed, and means responsive to an increase in engine speed above that of said rotated means and responsive to a decrease in engine speed below that of said rotated means for causing said control means respectively to increase and decrease the power output of said generator.

10. In apparatus of the character described, in combination, a dynamo electric machine having a field circuit, regulating means operating upon said field circuit, a rotated member partaking of any changes in speed of said dynamo electric machine, a member driven at a relatively fixed speed, and means responsive to the difference between the speeds of rotation of said two members for controlling said regulating means.

11. In apparatus of the character described, in combination, a power driven shaft, a load driven thereby, means for varying the load, and means for maintaining substantially constant speed of drive of said shaft, said means comprising a rotary member partaking of changes in the speed of said shaft, a rotary member driven at substantially constant speed, and means responsive to any difference in the speeds of said two rotary members for operating said load-varying means in a direction to increase the load upon an increase in speed of said shaft and to decrease the load upon a decrease in speed of said shaft.

In testimony whereof, I have signed my name to this specification this 25th day of July, 1929.

ALAN VARLEY LIVINGSTON.